Jan. 12, 1937.   K. E. KYLÉN   2,067,715
COMBUSTION MOTOR
Filed April 18, 1935
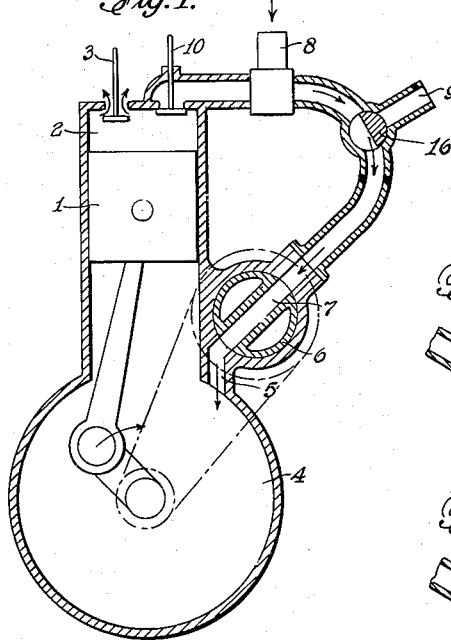
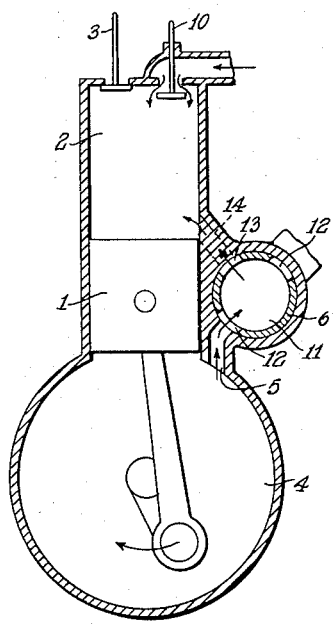
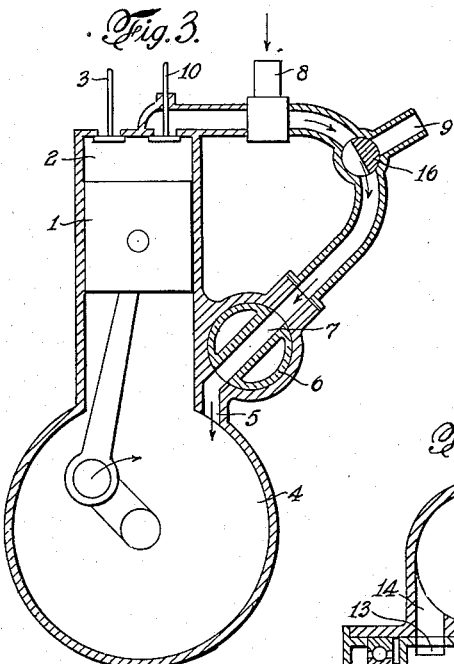
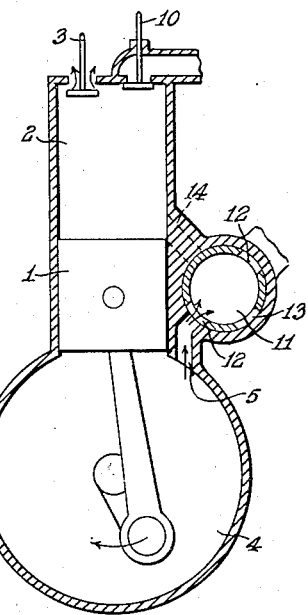
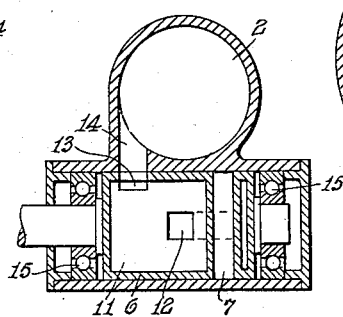
INVENTOR.
Karl Erik Kylén
BY
ATTORNEY.

Patented Jan. 12, 1937

2,067,715

UNITED STATES PATENT OFFICE 2,067,715

COMBUSTION MOTOR

Karl Erik Kylén, Goteborg, Sweden, assignor to Aktiebolaget Svenska Kullagerfabriken, Goteborg, Sweden, a corporation of Sweden Application April 18, 1935, Serial No. 16,948
In Sweden April 21, 1934

11 Claims. (Cl. 123—75)

The present invention relates to an arrangement in combustion motors which function according to the 4-stroke cycle principle and has for its object to increase the volumetrical degree of efficiency through providing a supercharge of air or gaseous mixture in the cylinders, to give the air or gaseous mixture a higher pressure than the atmospherical pressure at the end of the intake stroke, an object of the invention being to provide in 4-stroke cycle combustion motors in which the crank casing is furnished with a valve controlled inlet port and connected to the cylinder by means of one or more channels furnished with devices in such a manner that the crank casing forms a chamber for compressing air or gaseous charge to be supplied to the cylinder, channels associated with the devices and controlled in such a manner that they put the crank casing into communication with a chamber separated from the inlet of the crank casing, when the piston is in its lowermost position at each or every other revolution, and put the chamber and the crank casing into communication with the cylinder at the end of the inlet stroke. A further object is to provide in a device of this character a distributing device in the nature of a rotary valve 6 formed with a chamber serving as a receiver for a charge between two strokes of the machine.

The present invention also provides means, whereby the compression can be varied within certain limits and furthermore an internal cooling of cylinders, pistons and bearings is obtained permitting an increased compression pressure without any risk of pre-ignition taking place. The invention also offers increased efficiency in air craft designed for flying at great altitudes. Furthermore an increased number of speeds and means of regulating the proportion of fuel and air in the mixture through providing air from the crank casing are obtained, so that the most suitable mixture results at all speeds and output. It is also possible, within certain limits, to regulate the magnitude of the compression pressure which is substantially the same as a variable compression ratio.

My improved compressor for increasing the volumetrical degree of efficiency in motors will not increase the noise in the motor.

In order to attain the above mentioned advantages, the invention comprises such an arrangement in 4-stroke cycle combustion engines that the lubrication system for the cylinder and the bearings is designed to be independent of the crank casing; the crank casing serves as compressor and is connected to the cylinder by a duct which is laid free by the piston at the limit of the downward movement of the latter so that air or gaseous mixture can be compressed in the crank casing during each descending stroke and be drawn to the cylinder through the connecting duct, whereby an addition to the quantity of air drawn into the cylinder through the inlet valve is obtained at the end of each suction stroke.

One embodiment of the invention is illustrated in the accompanying drawing in which Fig. 1 shows a vertical section through a motor according to the invention during the exhaust stroke;

Figure 1a is a sectional detail at about right angles to position of the same parts in Figure 1.

Fig. 2 is a section through another vertical plane during the intake stroke;

Fig. 3 shows the same section as Fig. 1 during the compression stroke;

Fig. 4 shows the same section as Fig. 2 during the working stroke;

Fig. 5 is a longitudinal section through the rotary valve and

Figs. 6 and 7 illustrate different positions of the regulating valve.

In Fig. 1 the piston 1 of the cylinder 2 is in upward movement forcing the combustion gases through the exhaust valve 3, and forming a partial vacuum in the crank casing 4. This vacuum is filled out through the introduction of air or gaseous mixture into the crank casing when the piston approaches its upper dead point. The air or mixture is supplied through a duct 5 opening into the crank casing and the supply is regulated by a rotary valve 6 provided with a diametrical channel 7 which, in the position shown in the figure connects the carbureter 8 or the air intake 9 with the crank casing. The rotary valve is timed to run at half the number of revolutions of the crank shaft, so that the channel 7 will consequently connect the carbureter or the air intake with the crank casing at each upward stroke of the piston, i. e. during the exhaust as well as during the compression strokes.

The distributor valve 6 is shown as a rotary valve, the form of a cylinder closed at the ends, so that a chamber 11 is formed therein. The cylinder walls are provided with two diametrically opposed ports 12 and a port 13 which is axially and radially displaced relative to the port 12, as shown in Fig. 5.

At the downward movement of the piston during the intake stroke (Fig. 2) the inlet valve 10 is opened by means not shown, and air and gaseous mixture are drawn into the cylinder from the carbureter 8. The air introduced into the crank casing during the preceding stroke is simultaneously compressed until the position shown in Fig. 2 is reached during the latter part of the intake stroke. In this position the valve 6 has made a quarter of a revolution from the position shown in Fig. 1, and one of the ports 12 is exactly opposite the channel 5. The port 13 is simultaneously in communication with a channel 14 which opens into the cylinder. In the position shown, the channel 14 is laid free on the downward movement of the piston and the cylinder thereby communicates with the crank casing. The compressed air in the crank casing and the chamber 11 thus flows into the cylinder and increases the quantity of air or gas mixture already introduced through the inlet valve 10 which is then closed.

During the subsequent compression stroke (Fig. 3) the mixture is compressed in the cylinder in the ordinary way. At the same time the rotary valve 6 has made half a revolution so that the carbureter 8 or the air intake 9 again communicates with the crank casing 4 through the channel 7. A further charge of air or gaseous mixture is consequently introduced into the crank casing during this stroke.

During the explosion stroke (Fig. 4) the gaseous mixture drawn into the crank casing during the previous compression stroke is compressed. At the end of the working stroke one of the ports 12 of the rotary valve is laid free, and the gas flows through conduit 5 from the crank casing into the rotary valve. The port 13 is however now no longer in communication with the channel 14 and consequently the gas flowing into the rotary valve cannot proceed further. The chamber 11 within the rotary valve thus acts as a receiver in which gas is accumulated until the end of the subsequent intake stroke, when it flows into the cylinder, since the rotary valve has then reached the position at which the port 13 and the channel 14 communicate as described above with regard to Fig. 2.

The arrangement of the rotary valve of a single cylinder motor is shown in Fig. 5 which illustrates how the different ports and channels are located, in order that the air of the gaseous mixture will circulate through the rotary valve, the crank casing and the cylinder in the manner already described. The rotary valve is preferably mounted on ball bearings 15 and receives its motion and is timed from the chain driving the cam shaft of the motor.

In order to control the supply of air or gaseous mixture to the crank casing from the free air or from the carbureter, a 3-way valve 16, operated by means of a handle 17 in Figure 1a, may be preferably provided. By means of such a valve the quantity of air or of the gaseous mixture can be used as desired. In the last mentioned case the ratio of air to gas may be regulated so that best economical result is obtained. The 3-way valve governs the proportion of fuel and air as follows: In the position of the valve shown in Figure 1, it closes the air supply inlet 9, and a mixture of gas and air is admitted to the cylinder from the carbureter 8 by way of the valve 10 and by way of the crank casing through the distributer. If the valve 16 is turned to the position shown in Figure 7, the handle 17 being provided for that purpose, there will be admitted to the cylinder a mixture of gas and air from the carbureter through the valve 10 and an additional air charge brought in through the entrance 9 and supplied to the cylinder from the crank casing through the distributer. By more or less throttling the valve opening from the inlet 9, the amount of air let into the crank case can be regulated and, as the amount of mixture supplied to the carbureter remains unaltered, it is apparent that the proportion of fuel and air will thereby be varied.

Since the volume of the compression chamber in the cylinder is always the same, the magnitude of the compression will depend upon the amount of gas mixture or air supplied to the cylinder. The amount of air can, as above stated, be controlled by more or less throttling the valve opening from the air inlet 9. If more air is admitted, the compression will be greater and, if less air is admitted the compression will be less. By means of the same 3-way valve an adjustment can be made, so that air only is introduced into the crank casing, as shown in Fig. 7. In this case, the fuel mixture is supplied directly from the carbureter through valve 10.

Figure 6 illustrates, how the crank casing compressor can be closed off entirely if it is desired to permit the motor to run in the manner of an ordinary 4-stroke cycle motor, with fuel mixture from carbureter passing into the cylinder directly through valve 10 which may be operated in any approved manner.

When air only is to be introduced into the cylinder from the crank casing in the manner already described the air may be supplied to the cylinder chamber above the piston at the end of the suction stroke as well as at the end of the working stroke when the opening of the duct 14 is not covered by the piston. In the last mentioned case the air may be used for scavenging the cylinder so that residue of combustion gases remaining in the chamber at the extreme limit of the exhaust stroke is smaller than in an ordinary 4-stroke cycle motor. At the same time the air cools the piston and cylinder, making it possible to use a higher compression. In this case the rotary valve may be dispensed with, and the duct may be closed or opened by the piston in a similar manner to that in a 2-stroke motor.

In multi-cylinder motors air or gaseous mixture is introduced respectively into the rotary valve or into the receiver from several crank casings which means an increased mean pressure and an increased charge of the cylinder, since two charges from the crank casings will correspond to one cylinder charge according to the 4-stroke principle. In order to separate crank casings into which air is being drawn and crank casings under compression it is necessary that the inlet channel to the crank casing be at all times separated from the outlet channel from the crank casing.

The invention is of course not limited to the embodiments shown but may be applied in various manners. Similar devices may be applied to all kinds of 4-stroke cycle motors as well as to compressors.

Having thus described my invention, I claim and desire to secure by Letters Patent:

1. In a four-stroke cycle internal combustion engine, a crank-case for said engine provided with a combined inlet and outlet port; a distributer casing connected by means of a conduit to the inlet and outlet port of said crank-case; a second conduit connecting said distributer casing with the combustion chamber of said engine; means to supply at will pure air or a gaseous mixture to said distributer casing; a distributer in said distributer casing connected for timed operation with said engine and having two channels therethrough, one of which is expanded into a receiver, said distributer operating to connect the said crank-case to receive air or a gaseous mixture upon the compression stroke of the piston of said engine, and to compress said charge in the crank-case and receiver and permit storage of compressed air or gaseous mixture in the receiver upon the power stroke of said piston, and to permit an additional charge of air or gaseous mixture to pass to the crank-case of the engine upon the exhaust stroke of the piston, and to compress said additional charge in said crank-case and receiver during the inlet stroke of the piston and to pass said compressed charges from the receiver to the combustion chamber of the engine at the end of the inlet stroke of the piston; and means to exhaust the spent gases from the combustion chamber of said engine.

2. Improvement according to claim 1, characterized thereby that the distributer has the form of a rotary valve provided with a chamber which serves as a receiver for a charge between two strokes of the piston.

3. In a four-stroke cycle internal combustion engine, a crank-case for said engine provided with a combined inlet and outlet port; a receiver; a distributer casing; a distributer in said distributer casing connected for timed operation with said engine, being adapted to communicate with the receiver; there being a fuel supply conduit to the combustion chamber and an inlet valve therein, the organization being such that the entire fuel supply may be admitted through the said inlet valve and compressed air or no air at all through the distributer; a distributer casing connected by means of a conduit to the inlet and outlet port of said crank-case; a second conduit connecting said distributer casing with the combustion chamber of said engine; means to supply at will pure air or a gaseous mixture to said distributer casing; said distributer operating to connect the said crank-case to receive air or a gaseous mixture upon the compression stroke of the piston of said engine, and to compress said charge in the crank-case and permit storage of compressed air or gaseous mixture in the receiver upon the power stroke of said piston, and to permit an additional charge of air or gaseous mixture to pass to the crank-case of the engine upon the exhaust stroke of the piston, and to compress said additional charge in said crank-case and receiver during the inlet stroke of the piston and to pass said compressed charges from the receiver to the combustion chamber of the engine at the end of the inlet stroke of the piston; means to exhaust the spent gases from the combustion chamber of said engine.

4. In a four-cycle internal combustion engine, a crankcase for said engine provided with a combined inlet and outlet port; a distributor casing connected by a conduit to the inlet and outlet port of said crankcase; a second conduit connecting said distributor casing with the combustion chamber of the engine above the piston travel; a third conduit connecting the distributor casing with the combustion chamber of the engine through a port controlled by the piston at its extreme outward position; a distributor in said casing having two channels, one of which is expanded into a receiver; the other a through passage, means to supply at will pure air or a gaseous mixture to said distributor casing; means for operating said distributor in timed relation with the engine for admitting pure air or a fuel mixture to said crankcase upon the compression stroke of the piston, and to compress said charge in the crankcase and the receiver of the said distributor upon the power stroke of the piston, and to permit an additional charge of air or gaseous mixture to pass to the crankcase, upon the exhaust stroke of the piston, and to permit the compression of said additional charge in said crankcase and receiver during the inlet stroke of the piston, and to pass said compressed charges from the receiver to the combustion chamber at the end of the inlet stroke of the piston; means to exhaust the spent gases from said engine.

5. In a four-cycle internal combustion engine, a crankcase for said engine provided with an inlet and outlet port; a distributor casing connected thereto by a conduit, another conduit connecting the distributor casing with the combustion chamber of the engine, a distributor in said casing having two channels, one of which is expanded into a receiver, the other a through passage, means to supply at will pure air or a gaseous mixture to said distributor casing, means for admitting pure air or a fuel mixture to said crank case upon the compression stroke of the piston, means for operating said distributor in timed relation with the engine for compressing said charge in the crankcase and the receiver of the said distributor upon the power stroke of the piston and to permit an additional charge of air or gaseous mixture to pass to the crankcase upon the exhaust stroke of the piston and to permit the compression of said additional charge in said crankcase during the inlet stroke of the piston and to pass said charges from the receiver to the combustion chamber at the end of the inlet stroke of the piston, means to exhaust the spent gases from said engine.

6. In a four-cycle internal combustion engine, a crankcase for said engine provided with an inlet and outlet port; a distributor casing connected thereto by a conduit, another conduit connecting the distributor casing with the combustion chamber of the engine, a distributor in said casing having two channels, one of which is expanded into a receiver, the other a through passage, means to supply at will pure air or a gaseous mixture to said distributor casing, means for admitting pure air or a fuel mixture to said crank case upon the compression stroke of the piston, means for operating said distributor in timed relation with the engine for compressing said charge in the crankcase and the receiver of the said distributor upon the power stroke of the piston and to permit an additional charge of air or gaseous mixture to pass to the crankcase upon the exhaust stroke of the piston and to permit the compression of said additional charge in said crankcase during the inlet stroke of the piston and to pass said charges from the receiver to the combustion chamber at the end of the inlet stroke of the piston, means to exhaust the spent gases from said engine, means for supplying a carbureted mixture to said engine independently of the distributor and crankcase.

7. In a four-cycle internal combustion engine, a crankcase for said engine provided with an inlet and outlet port, a distributor casing connected by a conduit to one of the ports of the said crankcase, another conduit connecting the distributor casing with the combustion chamber of the engine, a distributor in said casing, having two channels, one of which is expanded into a receiver, the other a through passage, means to supply at will pure air or gaseous mixture to said distributor casing, means for admitting pure air or a fuel mixture to said crankcase, upon the compression stroke of the piston, means for operating said distributor in timed relation with the engine for compressing said charge in crank case and the receiver upon the power stroke of the piston and to permit an additional charge of air or gaseous mixture to pass to the crank case upon the exhaust stroke of the piston and to permit the compression of the said additional charge in said crank case during the inlet stroke of the piston and to pass said charges from the receiver and the crank case to the combustion chamber at the end of the inlet stroke of the piston, means to exhaust the spent gases from said engine.

8. In a four-cycle internal combustion engine, a crankcase for said engine provided with an inlet and outlet port, a distributor casing connected thereto by a conduit, another conduit connecting the distributor casing with the combustion chamber of the engine, a distributor in said casing, having two channels, one of which is expanded into a receiver, the other a through passage, means to supply at will pure air or gaseous mixture to said distributor casing, means for admitting pure air or a fuel mixture to said crankcase upon the compression stroke of the piston, means for operating said distributor in timed relation with the engine for compressing said charge in crank case and the receiver upon the power stroke of the piston and to permit an additional charge of air or gaseous mixture to pass to the crank case upon the exhaust stroke of the piston and to permit the compression of the said additional charge in said crank case during the inlet stroke of the piston and to pass said charges from the receiver and the crankcase to the combustion chamber at the end of the inlet stroke of the piston, means to exhaust the spent gases from said engine.

9. In a four-cycle internal combustion engine, a crankcase for said engine provided with an inlet and outlet port, a distributor casing connected thereto by a conduit, another conduit connecting the distributor casing with the combustion chamber of the engine, a distributor in said casing, a receiver in said distributer means to supply at will pure air or gaseous mixture to said distributor casing, means for admitting pure air or a fuel mixture to said crankcase upon the compression stroke of the piston, means for operating said distributor in timed relation with the engine for compressing said charge in crank case and the receiver of the said distributor upon the power stroke of the piston and to permit an additional charge of air or gaseous mixture to pass to the crank case upon the exhaust stroke of the piston and to permit the compression of the said additional charge in said crank case during the inlet stroke of the piston and to pass said charges from the receiver and the crank case to the combustion chamber at the end of the inlet stroke of the piston, means to exhaust the spent gases from said engine.

10. In a four cycle internal combustion engine, a crank case for said engine provided with an inlet and an outlet port; a distributer casing connected by a conduit to one of the ports of the said crank case; another conduit connecting the distributer casing with the combustion chamber of the engine; a distributer in said casing; a receiver; means for admitting pure air or a fuel mixture to said crank case upon the compression stroke of the piston; means for operating said distributer in timed relation with the engine for compressing said charge in the crank case and the receiver upon the power stroke of the piston and to permit an additional charge of air or gaseous mixture to pass to the crank case upon the exhaust stroke of the piston and to permit the compression of the said additional charge in said crank case during the inlet stroke of the piston and to pass said charges from the receiver and the crank case to the combustion chamber at the end of the inlet stroke of the piston; means to exhaust the spent gases from said engine.

11. In a four-cycle internal combustion engine, a crankcase for said engine provided with a combined inlet and outlet port; a distributor casing connected by a conduit to the inlet and outlet port of said crankcase serving to receive a charge between two strokes of the piston; a second conduit connecting said distributor casing with the combustion chamber of the engine above the piston travel; a third conduit connecting the distributor casing with the combustion chamber of the engine through a port controlled by the piston at its extreme outward position; a rotary distributor in said casing having two channels, one of which is expanded into a receiver; the other through a passage; means to supply at will pure air or a gaseous mixture to said distributor casing; means for operating said distributor in timed relation with the engine for admitting pure air or a fuel mixture to said crankcase upon the compression stroke of the piston, and to compress said charge in the crankcase and the receiver of the said distributor upon the power stroke of the piston, and to permit an additional charge of air or gaseous mixture to pass to the crankcase, upon the exhaust stroke of the piston, and to permit the compression of said additional charge in said crankcase and receiver during the inlet stroke of the piston, and to pass said compressed charges from the receiver to the combustion chamber at the end of the inlet stroke of the piston; means to exhaust the spent gases from said engine.

KARL ERIK KYLÉN.